(12) United States Patent
Daton-Lovett

(10) Patent No.: US 10,124,545 B2
(45) Date of Patent: Nov. 13, 2018

(54) APPARATUS AND METHOD FOR MANUFACTURING A COMPOSITE PRODUCT FROM PLURAL COMPONENTS

(71) Applicant: RTL Materials Ltd., Lymington Hampshire (GB)

(72) Inventor: Andrew James Daton-Lovett, Lymington (GB)

(73) Assignee: RTL Materials Ltd., Hampshire (GB)

( * ) Notice: Subject to any disclaimer, the term of this patent is extended or adjusted under 35 U.S.C. 154(b) by 408 days.

(21) Appl. No.: 14/764,783

(22) PCT Filed: Jan. 28, 2014

(86) PCT No.: PCT/GB2014/050219
§ 371 (c)(1),
(2) Date: Jul. 30, 2015

(87) PCT Pub. No.: WO2014/118523
PCT Pub. Date: Aug. 7, 2014

(65) Prior Publication Data
US 2015/0367584 A1    Dec. 24, 2015

(30) Foreign Application Priority Data

Jan. 30, 2013 (GB) .................................. 1301637.3

(51) Int. Cl.
*B29C 70/52* (2006.01)
*B29C 70/50* (2006.01)
(Continued)

(52) U.S. Cl.
CPC .......... *B29C 70/523* (2013.01); *B29C 43/224* (2013.01); *B29C 43/30* (2013.01);
(Continued)

(58) Field of Classification Search
CPC ... B29C 43/224; B29C 43/226; B29C 43/228; B29C 43/48; B29C 2043/483;
(Continued)

(56) References Cited

U.S. PATENT DOCUMENTS 2,779,388 A * 1/1957 Quoss ................... B29C 53/043
  264/137
3,223,027 A * 12/1965 Soda ..................... B29C 43/222
  100/154

(Continued)

FOREIGN PATENT DOCUMENTS

DE    19926155 A1    12/2000
DE    10123865 A1    11/2002
(Continued)

OTHER PUBLICATIONS

Eckstrom, "Welding of bistable fibre-reinforced thermoplastic composite pipelines," Doctoral Thesis, University of Cambridge, 2004.
(Continued)

*Primary Examiner* — Jeffrey M Wollschlager
(74) *Attorney, Agent, or Firm* — Pepper Hamilton LLP

(57) ABSTRACT

An apparatus and method for manufacturing a composite product from plural components are disclosed. The apparatus (10) comprises a conveyor assembly comprising back-to-back conveyor belts (16,18) which are drivable such that components can be received between the conveyor belts at an input end of the conveyor assembly and can be moved through the apparatus between the conveyor belts. A press (30) is arranged to consolidate the components into a flat form by the application of pressure to the components between the conveyor belts. The conveyor belts pass through a die (71) which is arranged such that consolidated components between the conveyor belts are shaped into a non-flat profile as they move through the die. A heater (38) is
(Continued)

arranged to apply heat to set the components into the non-flat profile to form the composite product (57).

13 Claims, 3 Drawing Sheets

(51) Int. Cl.
| | | |
|---|---|---|
| *B29C 43/22* | (2006.01) | |
| *B29C 43/30* | (2006.01) | |
| *B29C 43/48* | (2006.01) | |
| *B29C 53/04* | (2006.01) | |
| *B29D 23/00* | (2006.01) | |
| *B29C 70/56* | (2006.01) | |
| *B29L 23/00* | (2006.01) | |
| *B29C 53/52* | (2006.01) | |
| *B29K 105/08* | (2006.01) | |

(52) U.S. Cl.
CPC ............ *B29C 43/48* (2013.01); *B29C 53/043* (2013.01); *B29C 70/504* (2013.01); *B29C 70/52* (2013.01); *B29C 70/528* (2013.01); *B29C 70/56* (2013.01); *B29D 23/001* (2013.01); *B29C 53/52* (2013.01); *B29C 2043/483* (2013.01); *B29K 2105/0881* (2013.01); *B29L 2023/22* (2013.01)

(58) Field of Classification Search
CPC ....... B29C 70/523; B29C 70/56; B29C 70/52; B29C 53/043; B29C 70/528; B29C 70/504; B29C 43/30; B29C 53/52; B29D 23/001; B29K 2105/0881; B29L 2023/22
See application file for complete search history.

(56) References Cited

U.S. PATENT DOCUMENTS

| | | | |
|---|---|---|---|
| 4,006,617 A * | 2/1977 | Foster | B21D 5/083 |
| | | | 72/10.1 |
| 4,128,369 A | 12/1978 | Kemerer et al. | |
| 4,151,031 A * | 4/1979 | Goad | B29C 53/043 |
| | | | 156/201 |
| 4,186,044 A | 1/1980 | Bradley et al. | |
| 4,636,345 A | 1/1987 | Jensen et al. | |
| 4,777,005 A * | 10/1988 | Miller | B29C 53/043 |
| | | | 264/285 |
| 4,956,140 A | 9/1990 | Rolles et al. | |
| 5,057,175 A * | 10/1991 | Ashton | B29C 43/228 |
| | | | 156/202 |
| 5,264,060 A | 11/1993 | Lambing et al. | |
| 5,665,185 A | 9/1997 | Meeker | |
| 5,716,487 A * | 2/1998 | Sumerak | B29C 70/525 |
| | | | 156/359 |
| 5,827,460 A | 10/1998 | Brentrup et al. | |
| 5,891,379 A * | 4/1999 | Bhattacharyya | B29C 53/043 |
| | | | 264/280 |
| 6,068,715 A | 5/2000 | Yokokita et al. | |
| 6,217,975 B1 * | 4/2001 | Daton-Lovett | B29C 61/0608 |
| | | | 156/161 |
| 7,651,645 B2 | 1/2010 | Taylor | |
| 7,794,224 B2 | 9/2010 | Butteriss | |
| 8,123,510 B1 * | 2/2012 | Johnson | B29C 70/526 |
| | | | 156/245 |
| 9,248,613 B2 * | 2/2016 | Wilkerson | B29C 70/52 |
| 2007/0116991 A1 * | 5/2007 | Balthes | B29C 43/003 |
| | | | 428/35.6 |
| 2010/0006700 A1 * | 1/2010 | Stuhr | B64C 1/12 |
| | | | 244/123.1 |
| 2010/0009126 A1 * | 1/2010 | Leon | B64C 3/26 |
| | | | 428/174 |
| 2010/0283173 A1 * | 11/2010 | Kenny | B29C 47/027 |
| | | | 264/101 |
| 2011/0206906 A1 * | 8/2011 | Rubin | B29C 53/04 |
| | | | 428/188 |
| 2013/0196120 A1 * | 8/2013 | Gray | B32B 38/1866 |
| | | | 428/174 |

FOREIGN PATENT DOCUMENTS

| | | |
|---|---|---|
| DE | 10201033578 A1 | 2/2012 |
| EP | 0264663 A2 | 4/1988 |
| EP | 383572 A2 | 8/1990 |
| EP | 0515992 A1 | 12/1992 |
| EP | 2090423 A1 | 8/2009 |
| GB | 1013560 | 12/1965 |
| JP | 05615311 A | 2/1981 |
| JP | 2012214003 A | 11/2012 |
| WO | 2005/005115 A1 | 1/2005 |
| WO | 2012/016916 A1 | 2/2012 |

OTHER PUBLICATIONS

Iqbal et al., "Deployable Composite Slit Tubes," Proceedings of the IUTAMIASS Symposium on Deployable Structures, Cambridge, Sep. 6-9, 1998.

International Search Report dated May 27, 2014 in corresponding International Patent Application No. PCT/GB2014/050219.

British Search Report dated Jun. 19, 2013 in corresponding British Patent Application No. GB1301637.3.

* cited by examiner

APPARATUS AND METHOD FOR MANUFACTURING A COMPOSITE PRODUCT FROM PLURAL COMPONENTS

This application is a national phase filing under 35 U.S.C. § 371 of International Patent Application No. PCT/GB2014/050219, filed Jan. 28, 2014, which claims the benefit of British Patent Application No. 1301637.3, filed Jan. 30, 2013, each of which is incorporated herein by reference in its entirety.

The present invention relates to an apparatus and a method for manufacturing a composite product from plural components.

Composite materials are derived by combining two or more individual materials with intent of achieving superior properties over the components. Composites can be broadly defined as materials that contain reinforcement (such as fibres or particles) supported by binder (matrix). The composites typically have a discontinuous fibre or particle phase that is stiffer and stronger than the continuous matrix phase. Composites can be particulate-reinforced, fibre-reinforced or laminar composites.

The manufacture of composite structures generally involves placing the components in correct alignment to each other to achieve the desired material properties and forming the components into a whole. Fibre-reinforced composites used in most high-performance applications are laminated with unidirectional layers at discrete angles to one another, thereby distributing the in-plane load in several directions. A variety of fibre placement processes are used to achieve the desired combination of orientations. Some type of cure or moulding process follows the fibre placement process to set the product. Various manufacturing techniques are used depending on suitability to the type of part that is being manufactured.

Filament winding is a semi-automatic manufacturing method for making fibre reinforced composite materials by precisely laying down continuous resin impregnated roving or tows on a rotating mandrel that has the required shape. Various moulding techniques are also used for manufacturing composites. These can be manual or semi manual in nature. In a typical technique, fibre reinforcement, which may be pre-shaped is placed in the required arrangement in the cavity of a closed mould and a liquid resin of low viscosity is injected under pressure into the cavity, which is subsequently cured. Filament winding and moulding techniques are typically not useful for manufacturing continuous lengths of composite having a continuous cross section.

Pultrusion is a continuous, automated closed-moulding process that is cost effective for high volume production of constant cross section parts. The basic process usually involves pulling of continuous fibres through a bath of resin, blended with a catalyst and then into pre-forming fixtures where the section is partially pre-shaped & excess resin is removed. It is then passed through a heated die, where the resin undergoes polymerization, and which determines the sectional geometry and finish of the final product. However, pultrusion allows only limited control over the fibre orientation and is therefore limited in forming complex composite structures.

The use of fibre reinforced composite structure has been limited by high manufacturing cost due to their labour intensive manual lay-up processes, which are inherently costly, and which attract additional costs because of the extensive inspection required for quality control. These issues have been addressed by developing automated flexible manufacturing systems for advanced composite structures. A major difficulty identified in these programs is associated with the consolidation of "prepregs" (fibre arrays pre-impregnated with matrix) and dry fabric tows on the tool, particularly for components with curvature.

According to a first aspect of the present invention, there is provided apparatus for the production of a composite product from plural components, the apparatus comprising:

a conveyor assembly comprising back-to-back conveyor belts which are drivable such that components can be received between the conveyor belts at an input end of the conveyor assembly and can be moved through the apparatus between the conveyor belts;

a press arranged to consolidate the components into a flat form by the application of pressure to the components between the conveyor belts;

a die through which the conveyor belts pass, the die being arranged such that consolidated components between the conveyor belts are shaped into a non-flat profile as they move through the die; and, a heater for applying heat to set the components into the non-flat profile to form the composite product.

The invention provides an automated way of making composites. The press consolidates the components on the flat, which by applying pressure and optionally heat to partially melt the binder. Consolidating on the flat is simpler and more effective compared with trying to consolidate the components with a non-flat profile as for example prior art techniques such as vacuum moulding, etc.

A double conveyor is used to pull the product through a die stage to shape the profile of the consolidated components to a desired cross sectional form and to set the product into that shape by the application of heat. The die can be any arrangement shaped to hold the belts in conformance with the desired finished provide. The die may constrain the belts through some or all of the transition from the flat to the desired non-flat profile, or the die may just allow this transition to take place in an unconstrained length of belt between the flat state and the die profile. Little or no pressure need be applied to the consolidated components in the die stage to set the product. The use of conveyors passing through the die which "sandwich" the product as it is shaped in the die means that the product experiences little or no shear forces with the surfaces of the die as it is pulled through the die, which is important given the product is tacky and to maintain the alignment of the components of the composite, e.g. the reinforcing fibres.

Thus, the technique produces shaped composites with high accuracy in the placement of the component which is key in many applications to achieving the desired properties of the composite. The arrangement of having a separate press stage and stage of conveyors passing through a die means that the dies can be swapped for different profiles where it is desired to produce composite products with different cross sections or with different properties. This can be done simply without disrupting the press stage of the apparatus.

The conveyor belts can be "never-ending", i.e. a continuous belt that re-circulates, or a discontinuous belt in which two lengths of belt material are used, for example fed from a spool or cassette arrangement, that are then split off from the product and reeled/stowed. Using "never-ending" conveyor belts means that in principle composites of any length with a constant non-flat profile can be produced continuously by the apparatus. N.B. the "profile" here is the cross section of the product orthogonal to its longitudinal direction, i.e. the direction in which the product is pulled through the shaping die. The product can be cut to length by suitable cutting automation after the conveyor assembly.

The consolidated composite is generally in the form of a relatively thin, flat ribbon of material, i.e. having a thickness significantly less than the width of its profile, which is shaped by the die to have a non-flat profile whilst maintaining the thinness of the wall.

Preferably the die comprises a cooling section for cooling the composite product after is has been set. This cools the product to a temperature where it can be more easily removed from the conveyor belts and coiled or cut to length.

Preferably the cooling section of the die transitions from a non-flat profile to a flat profile. This help smooth the transition back to a flat profile as the conveyors will preferably be flat after exiting the dies at the end of their run. This is particularly useful where the product is a bistable reelable composite (BRC) and where it is desirable to coil the product as it leaves the conveyors which is aided by having the product flat.

In an embodiment the press is a belt press and wherein the belts of the conveyor assembly pass through the belts of the belt press so as to be at least partially drivable by the belt press. Thus, the conveyor belts are effectively made "parasitic" on the belts of the belt press, i.e. friction between the driven belts of the belt press and the belts of the conveyor assembly drives the belts of the conveyor assembly. This has a number of advantages. This allows, in a preferred embodiment, a flat heated double conveyor belt press may be used of the type commonly used for the lamination of polymer and fabric materials and the consolidation and impregnation of fibre reinforced composite materials. This has the advantage of allowing a standard item, available from a number of manufacturers, to be used as the flat plane consolidation section of the apparatus, allowing simplicity of construction and a high degree of flexibility. This can help reduce the cost of the apparatus.

Furthermore, this embodiment allows the dies and the parasitic belts designed to be fed through the dies to be made separate from the relatively high pressure flat belt press that provides the majority of the heat needed to process the product and provides the high pressures needed to ensure good flow and consolidation in many fibre reinforced composites, allowing them to be more easily changed for differing product lines. This can also allow the use of multiple dies and parasitic conveyors on a single flatbed belt press given a belt press of sufficient width.

In another embodiment, instead of having parasitic belts separate from the belt press, a custom belt press could be manufactured where the belts of the belt press are extended to pass through the dies and such that no parasitic conveyors need be used.

As will be appreciated, other arrangements of the belts are possible. In some embodiments, a single back-to-back conveyor assembly is used where in the upper and lower belts pass through the belt press and the dies. However, in principle, more than one double conveyor assembly can be used in series to move the product through the press and die stages of the apparatus.

Preferably the die is arranged to form the product to have a generally convex surface on one side and a generally concave surface on the other side, wherein prior to being passed through the die a first substrate is applied to the convex surface of the product and a second substrate is applied to the concave surface of the product, wherein the first substrate is more extendible than the second substrate, wherein each substrate is either provided by a conveyor belt or by a membrane positioned between the product and the conveyor belt. The concave surface and convex surface refer to opposed sides of the product wherein at least Preferably the second membrane is substantially inextendible. This has the advantage of allowing precise placing of components and in particular reinforcing fibres as the product is shaped. In particular, as the product is shaped to a non flat profile by the die, the components of the product on the concave side of the product have a shorter path length than the components of product on the convex side (due to the shorter radius of curvature on the concave side). This has the tendency of making the components on the concave side loose tension and or buckle to accommodate the shorter path length they are forced to adopt. This is undesirable since in many applications it is necessary to control the orientation of the product closely.

For example, in fibre reinforced composites it is important that the fibres are kept taught/straight. By using a sufficiently non-extensible substrate arrangement on the concave side and extensible substrate on the convex side, the component on the non-extensible substrate is not allowed to compress due to the relatively non-extensible nature of the substrate, whereas the components on the convex side are allowed to move by the more extensible substrate. Thus, only the components on the convex side move to compensate for the different path lengths produced by curving the profile and this movement on the convex side is in tension, which maintains the straightness of the components. Effectively this arrangement redefines the neutral axis of bending to be that of the concave face which is remains adhered to the non extendible substrate. The components on the concave side by comparison are not allowed to compress and buckle. This allows precise placing of components and in particular reinforcing fibres by allowing fibres to be tensioned not compressed in order to compensate for the different path lengths and radius of curvatures of the fibres on the inside and outside curvatures.

It is noted that the movement of the components on the convex side may change the angle of the components. However, since this movement is tensile, the movement can be predicted using known techniques and thus the movement can be compensated for in the initial orientation of the components so that the desired final orientation of components is achieved in the final composite product. This is particular useful in achieving the precise orientation of fibres or the like that is necessary in producing bistable reelable composites (BRCs).

Preferably, the relatively extendible substrate is provided by a membrane positioned between the product and the conveyor belt. The extendible membrane can be thought of as a thin release film put onto the product as it is fed between the conveyors and preventing that side of the product sticking to the belt during processing. This allows the slippage and extension on the outer face of the curve and managing buckling in fibres on the inner face. Preferably the relatively less extendible substrate is provided by the conveyor belt on that side.

In an alternative embodiment, the relatively less extendible substrate is provided by a conveyor belt itself. For example, the belt on the concave side can be made out of rubber or something else extensible in its own right.

Separate membrane or membranes can be brought together with the components of the product as it is fed into the conveyor assembly.

In an embodiment, the apparatus comprises an applicator for adhering one or both of the surfaces of the product to the respective substrate prior to being passed through the die. This adhesion can naturally arise through the tackiness of the consolidated material. Alternatively an adhesive layer or similar can be added between the membrane and the product during the process, for example as the components and membranes are brought together prior to entering the conveyor assembly.

In an embodiment, the die is arranged to form the product into a slit tube, the apparatus comprising a sealing assembly after the conveyor assembly for sealing the slit to form a pipe. As will be appreciated, having continuous conveyor belts following the inside and outside surfaces of the product makes the apparatus mostly suitable for forming non closed profiles. However, a closed profile can be formed by producing a member having a relatively small slit. The apparatus can then seal the slit by welding, adhesive, etc., to form a pipe.

Preferably, the apparatus comprises one or more tensioners before the conveyor assembly arranged to tension one or more of the components prior to being received between the conveyor belts. This helps feed all of the components into the conveyor assembly at appropriate tensions and alignments. This can be particularly useful when it is desired to embed fibre optics in the composite. Because the composite tends to shrink slightly when being cured, applying a pretension to the fibre optic cables helps keep these taught in the final product.

According to a second aspect of the present invention, there is provided a method of for the production of a composite product from plural components, the method comprising:

moving the components with a conveyor assembly comprising back-to-back conveyor belts which are driven such that the components are received between the conveyor belts at an input end of the conveyor assembly and moved through the apparatus between the conveyor belts;

applying pressure to the components between the conveyor belts to consolidate the components into a flat form;

passing the conveyor belts through a die, such that the consolidated components between the conveyor belts are shaped into a non-flat profile as they move through the die; and, applying heat to the consolidated components to set the consolidated components into the non-flat profile to form the composite product.

Preferably the method comprises applying heat as well as pressure to consolidate the components. This helps achieve a better consolidation of the product.

Preferably the method comprises arranging the layers of the composite to form a bistable rollable coil member.

Preferably the method comprises forming a composite product in the form of a slit tube member and sealing the slit to form a pipe.

In embodiments, the materials include prepreg layers.

In embodiments, the composite binder includes one or more of: thermosetting or thermoplastic products.

In embodiments, the composite fibres include one or more of: E-glass, Aramids, Carbon, Metal fibres, Polyester and other textile fibres.

In an embodiment, the components include optic fibres, the method comprising tensioning the optic fibres prior to being fed into the conveyor assembly.

The preferred embodiments are particularly advantageous in the manufacture of parts such as Bistable Reelable Composites (BRCs) which are inherently capable of being produced as long continuous sections and then coiled for storage or transportation. The preferred embodiments are also particularly advantageous in the continuous or semi-continuous forming of any thermoplastic, thermosetting or other thermally formable curved or partially curved profile in which processes such as extrusion, pultrusion and pull winding are of limited utility. In particular this is the case in the continuous manufacture of fibre reinforced composite profiles, due to the problems of controlling fibre placement during production processes involving the passage of the product in contact with die faces which exert sheer forces on the material. This is also the case due to the complexity and relative slowness of processes such as filament winding or pull-winding in which the fibre reinforcement has to be built up layer by layer and where there are limits on the placement angle due to the tendency, beyond certain limits, of fibres in tension to slip along the underlying formers.

While the geometry of using a double belt system passing through a die may in practice prevent the closure of the tubular profile as it passes through the die, preferred embodiments can be used in making closed section tubes. This is likely to be significantly faster and of lower capital cost, as well as allowing better optimisation of component material placement, than current systems used for the manufacture of, particularly but not exclusively, fibre reinforced composite tubes and other closed sections. This being the case, it lends itself well to the production of profiles that have only a slight gap between faces on an otherwise close profile, that can then be fully closed, either as an integral part of this process with a bonding, joining or welding head placed in-line with this apparatus, or as a post-operation. In the case of thermoplastic materials, or those which have thermoplastic contact faces as part of their structure, this can be achieved by welding and a system for such welding has been demonstrated that can offer bond line integrity close to that of the parent material. Other materials may be closed at the gap by glue bonding, mechanical fastening or any other means found appropriate for the particular intendeds use.

Embodiments of the present invention will now be described by way of example with reference to the accompanying drawings, in which.

Figure 1:
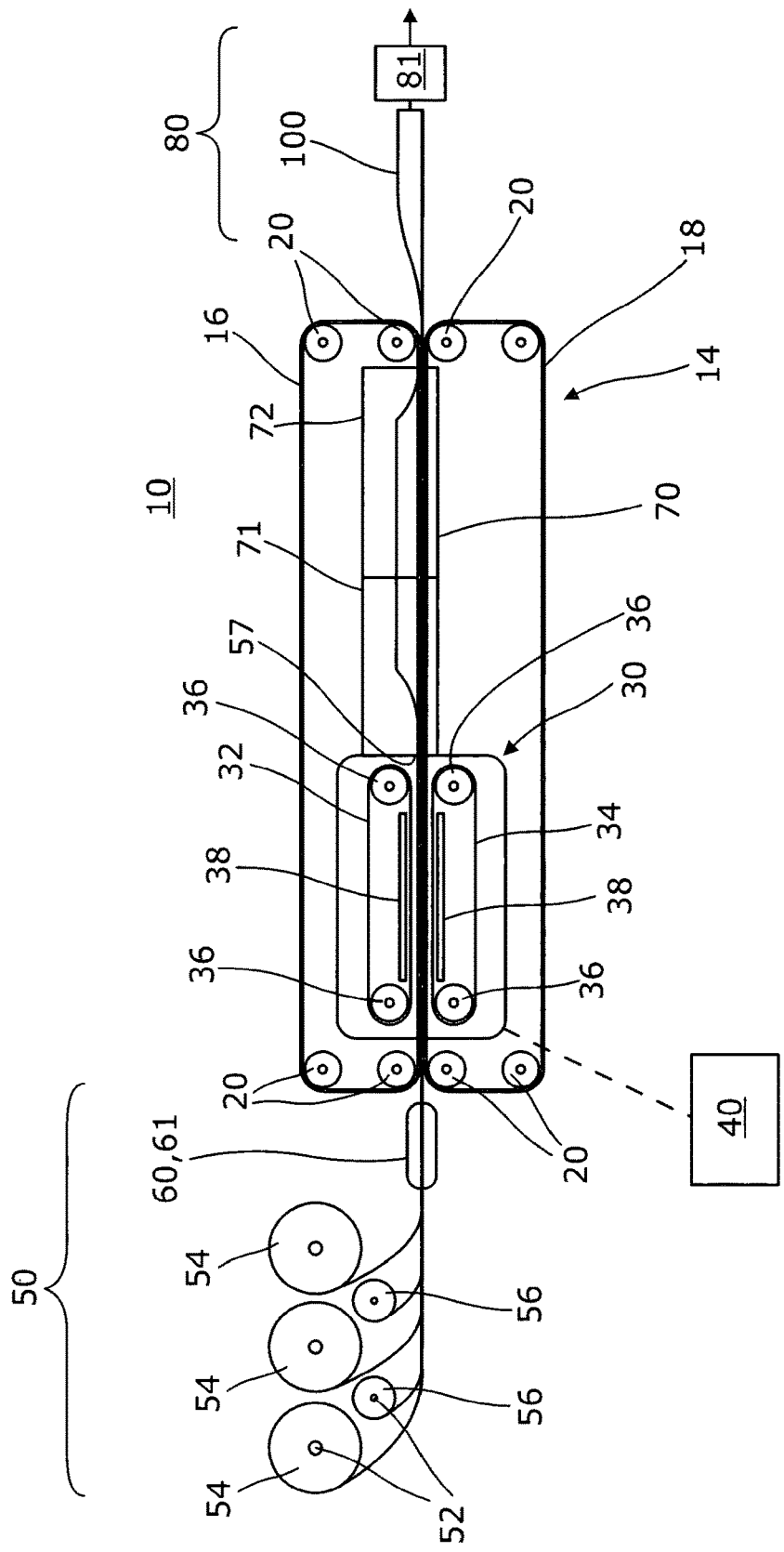
FIG. 1 shows schematically from the side an example of apparatus for the production of composite materials in accordance with an embodiment of the present invention.
Figure 2:
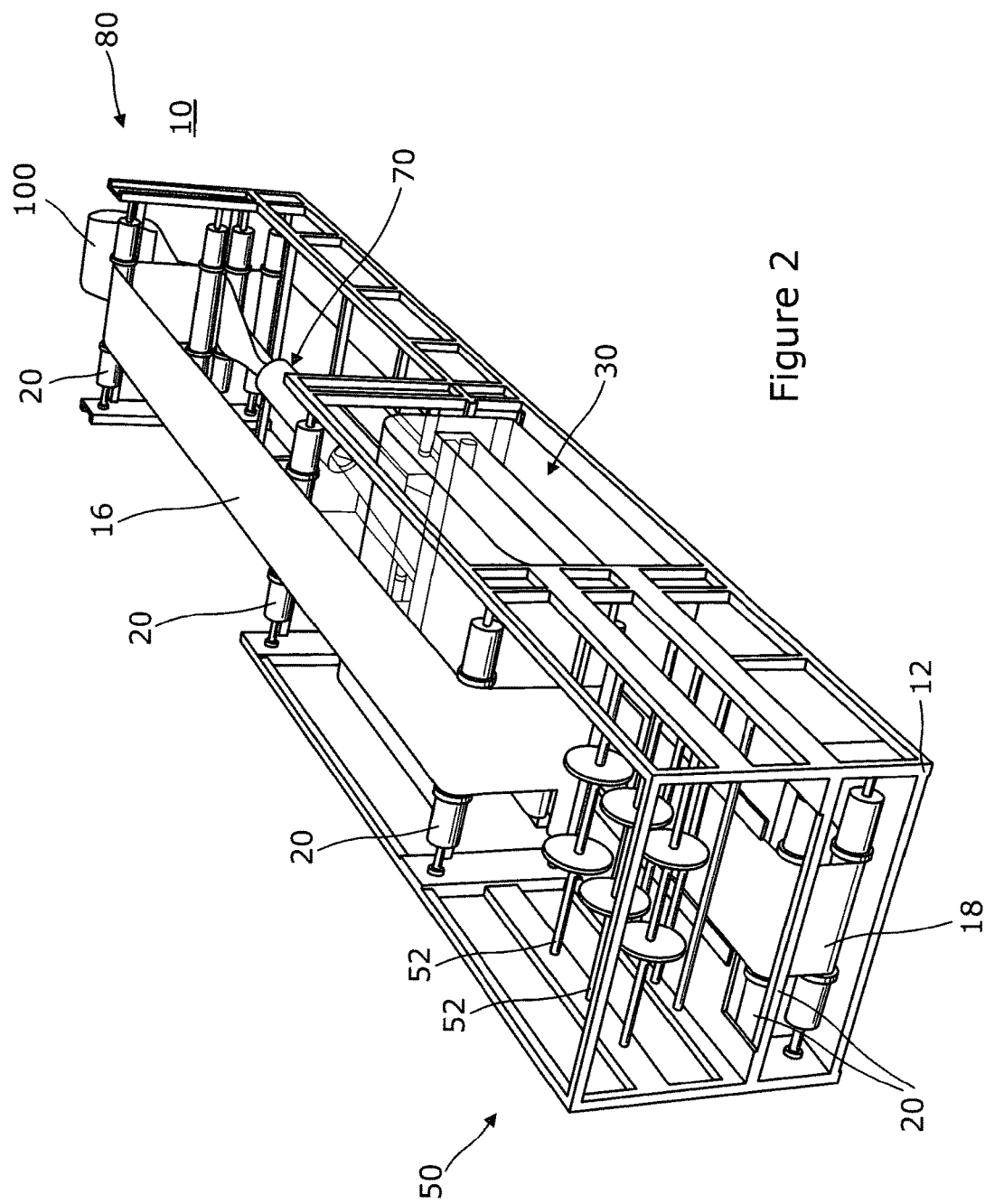
FIG. 2 shows a perspective view from the front of an example of apparatus for the production of composite materials in accordance with an embodiment of the present invention; and, FIG. 3 shows a perspective view from the front of an example of apparatus for the production of composite materials in accordance with an embodiment of the present invention.
Figure 3:
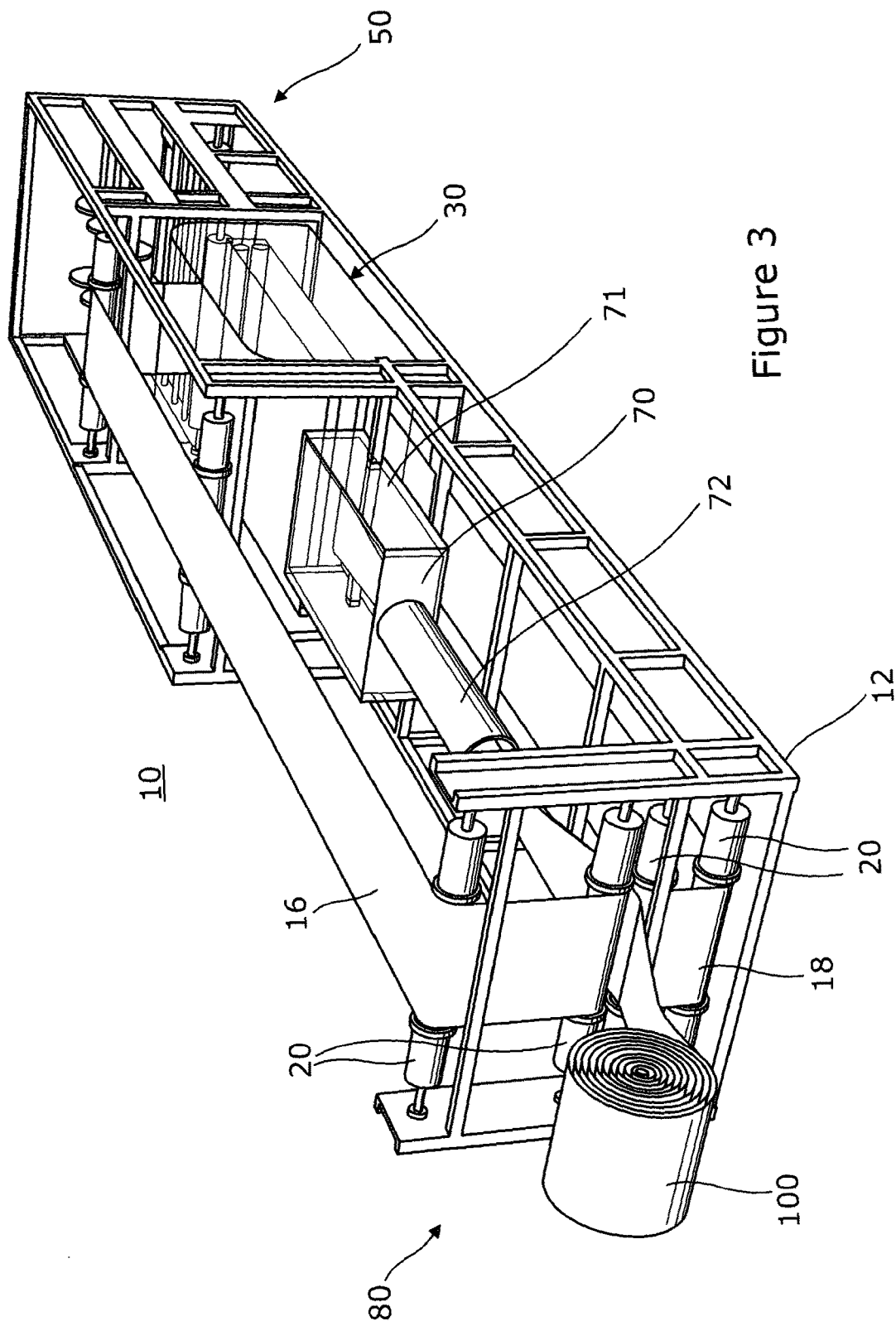

FIGS. 1 to 3 show views of an example of apparatus 10 for the production of composite materials 100 in accordance with an embodiment of the present invention. The apparatus 10 comprises a support structure 12 to which various elements of the apparatus are attached as will be described below. The apparatus 10 comprises a conveyor belt assembly 14 comprising an upper conveyor belt 16 back to back with a lower conveyor belt 18. Both conveyor belts 16, 18 are in a continuous loop tensioned around rollers 20, which are mounted to the support structure, and which rotate to allow the belts 16, 18 to move.

The apparatus 10 also comprises a belt press 30, which are known per se. In the present example, the belt press 30 comprises a pair of driven, back-to-back conveyors 32, 34. The belt press 30 has pressure rollers 36 or the like arranged to controllably exert pressure to a workpiece passing through the belt press 30 between its conveyor belts 32, 34. The belt press 30 also has heaters 38 adjacent to one or both conveyor belts 32, 34 to heat the workpiece as it is passed through the belt press 30 between the conveyor belts 32, 34.

A controller 40 is provided to controls the operation of the belt press, i.e. drive the belts at a selected speed, selectively apply heat and or pressure to the workpiece in the belt press, either automatically or semi automatically in response to suitable inputs from an operator. The controller 40 is preferably a computer system or other electronic system. The controller 40 or a separate controller can also control other aspects of the apparatus, such as the heating/cooling of the dies to achieve a desired temperature.

The upper and lower conveyor belts 16, 18 of the conveyor belt assembly 14 pass through the conveyor belt pair 32, 34 of the belt press 30. Preferably the conveyor belts 16, 18 of the conveyor belt assembly 14 are "parasitic" on the conveyor belts of the belt press 30. In other words, the belts of the conveyor assembly 14 are moved via frictional forces with the conveyor belts of the belt press 14. (Note, the lower conveyor 18 of FIGS. 2 and 3 differs slightly from the conveyor 18 shown in FIG. 1 in that it extends beyond the upper conveyor 16.)

Alternatively or additionally, the conveyor belts 16, 18 of the conveyor assembly 14 may be driven by other drive means, such having one or more of the rollers 20 being driven by a motor, under control of the controller 40.

The apparatus 10 has a feed on area 50 upstream of the conveyor assembly 14 where reels of component material are mounted on spindles/axles 50. In the present example, the component materials include reels of prepreg 54, i.e. fibre arrays that have been already impregnated with matrix. The component materials 50 also optionally include fibre optic cable 56. Other component materials may be used according to the desired finished product. Also in the feed on area 50, the apparatus 10 has feed guides 60 to guide the component materials 50 into the conveyor assembly 14 and optionally tensioners 61 to tension the fibre optic cables 54 to an appropriate tension.

The components 50 are then drawn through by the conveyor assembly 14 by the parasitic belts 16, 18. The components 50 are first consolidated on the flat by the belt press 30 to produce a ribbon-like consolidated composite 57. The preliminary application of heat and pressure needed for consolidating of the component materials is first carried out between flat pressure rollers 36 of the belt press by the application of heat and or pressure. This consolidation process ensures a close joining of the parts on a flat surface and aims to eliminate or at least reduce air bubbles, voids, etc. between the components in the laminate product. The components 57 are heated to the point of being tacky and pliable during this consolidation process, but are not fully cured/set at this stage.

The apparatus 10 includes a die assembly 70 after the belt press 30 where the consolidated composite 57 is shaped and set. The conveyors 16, 18 pass into the die with the consolidated composite and remain in contact with the consolidated composite as it passes through the die assembly 70. Thus, the conveyors 16, 18 and not the consolidated composite 57 is in contact with the die assembly 70.

The die assembly 70 has a hot forming section 71 through which the flat consolidated composite 57 exiting the belt press passes first. In the hot forming section 71, the die assembly 70 shapes the consolidated composite to a constant, non-flat cross section and heat is applied to set the materials into their shaped form. The die assembly 70 also has a cold forming section 72 after the hot forming section 71 where the shaped composite is cooled to the point where it is cool enough to take off and either coil or cut ready for storage or use. The apparatus 80 has a feed off area 80 after the end of the conveyor assembly 14 where the finished product is coiled and or cut. Preferably the cold forming section 71 guides the product back to having a flat cross-section as it exits the die assembly 70 to aid passing through the rollers 20 at the end of the conveyor assembly 14. This also helps in coiling and or cutting the finished product to length.

Thus, the apparatus 10 allows superior mechanised production of composites or laminates where the product is consolidated on the flat and they passed through a die assembly where the product is shaped and set through application of heat. Production can be continuous, allowing product of any length to be produced. Consolidating on the flat allows superior consolidation to be performed. Passing the product with the dual conveyors 16, 18 through the die allows superior control of the product as it is shaped in the die.

This method can be applied to both thermosetting or thermoplastic products, or to combinations of both thermosetting and thermoplastic materials or to any other material or combination of materials that can be formed into a stable form by the application of heat, with or without pressure and subsequent cooling. The method can be used to form bistable reelable composites (BRC).

Various components of the apparatus are now discussed in more detail.

Belt Press 30

A number of companies manufacture units of this type on scales ranging from 500 mm wide, 60 mm heated length units widely used in the garment trade, through to 5 m belt width units with multiple heat zones, pre-heater systems, zone controllable hydraulic pressure systems for both heated platens and cinch rollers and computer controlled temperature pressure and tracking systems.

Reliant Machinery of Luton, the United Kingdom manufactures belt presses of the sort suitable for use with the present apparatus 10. The belt presses 10 made by Reliant Machinery are modular in nature, so an initial setup could be added to, thus increasing throughput, as demand rises.

The range of belt width, feed speeds and pressure achievable on both platens and cinch rollers, is large. Generally, the longer the heated section is, the faster the through-put for a given material. The pressure also has a significant effect on the range of materials that can be handled, as low pressure systems require much longer time-on-temperature to consolidate a given lay.

The decision on which belt press 30 to use can be made before the rest of the system design and build commence. This decision is ultimately a commercial one. Wider belted machines have the inherent advantage that parasitic conveyors for particular products can be fed through in parallel if the width of the job is less than half that of the press belt, multiplying throughput by the number of parasitic conveyors fitted. Each line can feed through a different die set, so more than one product type can be made simultaneously.

For particular example, in order to reach the diameters for BRC sleeves of about 60 cm, the belt press would need a bed width of approximately 2.5 meters.

Parasitic Conveyor Assembly 14

In an alternative embodiment to the one shown by FIG. 1, the apparatus 10 could be constructed as a customized belt press, with the belt press conveyors extending out of the belt press body and running through the dies, instead of having separate parasitic conveyor belts 16, 18 as shown in FIG. 1. It may, however, be preferred to use a standard belt press 30 and fitting the individual parasitic belts 16, 18 for each product line in a parasitic manner, i.e. so that they run through the belt press as part of the job and extend out to run through the forming die sections 71, 72 before re-circulating to be fed back through the belt press 30.

Advantages of using a parasitic conveyor assembly 30 include the following.

There are no structural modifications to the belt press needed, which is a significant saving in development time.

Individual lines, consisting of the parasitic conveyor belts 16, 18 and associated set of feed spools 60, tensioners 61 and dies 70, can be made separately and set-up and removed from the press 30 without disturbing the basic press set-up.

The system is extremely flexible as multiple parasitic belts 14 and die sets 70 can be run simultaneously on the same belt press 30. Sets can be added or removed without disturbing other sets that are already in place.

Expansion is facilitated as new belt press capacity can be brought in and integrated to existing die/parasitic belt sets with minimal modification or disruption.

This approach does however mean that care will have to be taken to design the parasitic belt/die sets so that they do not potentially interfere with their neighbours if multiple sets are fitted.

It may be advantageous to put an independent drive onto the parasitic conveyors 14, in order to reduce the load on the main belt press drive 30 and reduce the possibility of slippage. This could be combined with tensioner and alignment systems and it is expected that suitable systems may be available off the shelf from manufacturers of conveyor systems.

The apparatus may be arranged such that there is side access for changing/fitting belts. Alternatively, a belt bonding system can be used to join the belts.

The conveyor belts 16, 18 can be "never-ending", i.e. a continuous belt that re-circulates as shown in FIGS. 1 to 3. Alternatively, discontinuous belts can be used (not shown) in which two lengths of belt material are used for moving the product through the press and die sections. The two lengths can be fed from a spool or cassette arrangement, then split off from the product after the product has been shaped by the die section, and then either reeled/stowed for reuse or scrapped. The apparatus can be otherwise the same as shown in FIGS. 1 to 3. In particular, the apparatus can be a stand-alone custom unit, or use a belt press and parasitic belts, as described above.

Heated Die Section 71

A very simple way of shaping the flat consolidated ribbon 57 to its final curved form is to tension the belts 16, 18 of the conveyor assembly 14 between two guides: the first guide being flat at the beginning of the hot forming section 71, and second being curved to the desired profile shape at the end of the hot forming section 71. These can be within a hot-air oven to apply the heat to cure the composite.

This system has the advantage of being very simple to manufacture.

In another system, a matched mould die is used which follows the inner and outer curve profiles of the transition from flat to fully formed. This could either be fitted with embedded heating elements, or be placed within an oven to keep the material at the required temperature during forming. This system is advantageous in avoiding delamination of the composite, particularly in thicker lays.

In short, the die provides two surfaces, or even parts of two surfaces, the gap between which provide the required profile for the product. The die can be tubular, or follow the transition of the product from flat to the finished profile, or any combination thereof. As will be appreciated, very many profiles for the product can be achieved through this method. Furthermore, may ways of arranging the die section can be used to achieve the final desired profile.

The length of the die 71 from flat to fully-formed is defined by the distance needed to form this transition curve, without buckling.

It is desirable that the die 71 continues beyond the fully formed section, to allow for some resting time at temperature for the polymer, before entering the cooling section 72. Different polymers have differing responses to crystal formation during this type of hold phase, varying from olefins which have very little sensitivity to hold times to some TPUs (Thermoplastic polyurethane) that need to be held in the formed state before cooling in order to achieve their best mechanical properties. The parameters for any given heated die are preferably specified in accordance with the characteristics of the polymer being used.

Cooling Die Section 72

The cooling die section 72 consists of an inner and outer support sleeve, supplied with cold water or other coolant in a jacket and/or internally. Its length is a function of the speed of throughput, the nature of the coolant and the thermal mass and conductivity of the job itself. In practice, getting heat in is usually much slower than getting it out and this is likely to be the longest of the process sections. It is relatively straightforward to calculate the cooling length needed for a given job at a given throughput. As large diameter, relatively thick sections will require significantly longer cooled sections than smaller ones it will be important in designing the layout of the system on the feed-off side and choosing a site for the its operation that sufficient space is allowed for the longest cooled section likely to be required.

Feed In 50, 60, 61

The feed in section 50, 60, 61 can be a standard assembly of reel handling stands 52, guides 60 and tensioners 61. A number of companies manufacture equipment of this type for use in the textile and composite industries and the basics should be available "commercial off the shelf". The feed on mechanism should also be fitted with the capacity to insert release films and peel plies, not only along the full length but at specific points during production, to facilitate access to fibre optics for splicing in the field.

Fibre Optic Feed and Tensioner 60

The inclusion of fibre optics in the composite is optional. Fibre optics embedded in the composite can be used for example as sensors or for communications. Due to the need to keep the fibre optics straight and at a close to zero residual strain, a tensioner mechanism 61 will be needed at the feed in end that can be adjusted to put an accurate and predictable pre-strain onto these fibres. This is because the materials of the composite will be bonding to the fibres at elevated temperature and will tend to then experience shrinkage as they solidify and cool. So in order to be close to zero strain after manufacture, the fibre optics need to be pre-strained on the input side. A large number of comparable fibre-tensioning sub systems exist on sewing, knitting and fabric handling machines of every type. A suitable tensioner 61 should be identifiable from these sources.

Feed Off 80

The feed off end will consist of a coiling mechanism for the finished product, together with means to measure throughput and to cut off when the length required is reached. Reeling mechanisms of this type are commonplace, although the cutting head may need to be specially adapted according to the product.

Materials

The apparatus may be used with but not limited to all olefins and thermoplastic urethanes. Other polymers may be used and this is likely only to be limited by max working temperature. High temperature thermoplastics—PEEK, PEK TP Polyam ides may be useful but standard production equipment from the laminating industry normally only works up to 220/240 deg C.

The apparatus may be used with all standard reinforcing fibres. E-glass is likely to be by far the most common reinforcement but the preferred apparatus should be designed to use Aramids, Carbon, Metal fibres, Polyester and other textile fibres should the need arise.

The preferred apparatus may use thermoplastic matrix polymers. It may be desirable, e.g. for environmental reasons, to use thermosetting matrix polymers. As the basic belt press geometry is consistent with using thermosets, the design and build should take account of the possibility of retrofitting longer heated curing sections if this need should arise.

Membranes

In a preferred embodiment, the convex surface of the product is adhered to a relatively extensible substrate and the concave surface of the product is adhered to a generally inextensible substrate during the forming process in the die. The substrate can be provided by a separate membrane applied to the product, or by using the predetermined properties of the conveyor belt on the relevant side of the product. As explained in greater detail below, this is advantageous where any fibre or other constituents of the product are prone to displacement or buckling as they are formed.

In one example, an extensible membrane is applied to the convex surface of the product, combined with the use of a relatively inextensible conveyor belt on the concave surface of the product during the forming process. Alternatively a relatively inextensible membrane can be applied to the concave surface of the product. The membranes can be provided as separate reels of material (e.g. provided on reels 52) which are fed through the conveyor system on the external sides of the components. Once the product has been formed, the membranes can be removed from the product.

This is such as to ensure that any fibre or other oriented constituents of the product can distort only in a tensile sense, such as to ensure that they remain straight and to eliminate the tendency of any component loose tension and possible buckle. This is especially useful for the reinforcing fibres of a fibre reinforced composite. The tendency as the consolidated materials are shaped from flat to non flat by the die 70 is for any fibres on the concave side of the product to be "compressed" due to the lower radius of curvature and path length on the concave side and therefore lose tension and possibly buckle, whereas the tendency for fibres near the convex side is to be tensioned due to the higher radius of curvature and resulting path length on the convex side. It is desirable to control placement of the fibres and in particular to keep fibres tensioned to control their positions and keep them straight. The use of a generally inextendible substrate on the concave side prevents the fibres on this side from being compressed, whereas the extensible substrate on the convex side allows fibres on this side to move.

It should be noted that such fibres or any other elements that may be prone to buckling on the concave side of the desired formed profile will still undergo changes in their angles relative to the axis of forming but that as these changes are under tensile loading only, the magnitude of such changes in angle is predictable and importantly straightness will be maintained. This is accomplished by ensuring that the product, during processing, is adhered to the surface of the extensible and inextensible substrates. This is likely to be a result of melt during the processing of thermoplastics and of the inherent tackiness of thermosetting materials pre-cure. However, if desirable, a low tack adhesive or other suitable medium may be used at the substrate/product interface to accomplish this purpose which can later removed from the finished product. Provided these conditions pertain, as the product is curved into the desired profile as it enters and runs through the die 70, it will remain adhered on the concave surfaces to the inextensible substrate, preventing compressive distortion on this face, whilst the extensible substrate on the convex surfaces can stretch, allowing them to extend.

The relatively extensible substrate is preferably thin with a high Young's modulus. Preferably, the relatively extendible substrate is capable of extending to the peak strain seen as a result of the difference between the inner and outer curved path lengths under the forces acting on this during the act of forming.

A further class of composite member having a constant cross section are described in "Iqbal K., Pellegrino S. and Daton-Lovett A. J. (1998) (Deployable Composite Slit Tubes" Proceedings of the IUTAMIASS Symposium on Deployable Structures, Cambridge, UK, 6-9 September). These STEMs, generally known to practitioners of the art as Bistable Reeled Composites (BRCs) differ from the other classes in having the engineering constants, particularly the Poisson's Ratio and Isotropy of the materials from which they are manufactured, engineered in such a manner as to cause them to spontaneously form into a coil as the primary curve is straightened. They are usually engineered in such a manner as to cause both the extended and coiled forms to be stable, removing the need for constraining the coiled form for storage, transport, etc.

The technique described above using an extensible and non extensible substrate is likely to be of utility in the manufacture of parts such as BRCs which are inherently capable of being produced as long continuous sections and then coiled for storage or transportation. More generally, this technique is likely to be of utility in the continuous or semi-continuous forming of any thermoplastic, thermosetting or other thermally formable curved or partially curved profile in which processes such as extrusion, pultrusion and pull winding are of limited utility. In particular this is the case in the continuous manufacture of fibre reinforced composite profiles, due to the problems of controlling fibre placement during processes involving the passage of the product in contact with die faces which exert sheer forces on the material, or the complexity and relative slowness of processes such as filament winding or pull-winding in which the fibre reinforcement has to be built up layer by layer and there are limits on placement angle due to the tendency, beyond certain limits, of fibres in tension to slip along the underlying formers.

Closed Sections

Although not inherently suitable for tubes and other closed sections, as the geometry of the conveyor assembly 14 prevents closure of the profile, the apparatus 10 is likely to be significantly faster and of lower capital cost, as well as allowing better optimisation of component material placement, than current systems used for the manufacture of, particularly but not exclusively, fibre reinforced composite tubes and other closed sections. This being the case, it lends itself well to the production of profiles that have only a slight gap between faces on an otherwise closed profile, that can then be fully closed, either as an integral part of this process with a bonding, joining or welding head placed in-line with this apparatus, or as a post-operation. In the case of thermoplastic materials, or those which have thermoplastic contact faces as part of their structure, this can be achieved by welding and a system for such welding has been demonstrated, see for example "Welding of Glass Reinforced Polypropylene Composites", Auth: Lars Eckstrom, Doctoral Thesis, University of Cambridge, 2004, that can offer bond line integrity close to that of the parent material. Other materials may be closed at the gap by glue bonding, mechanical fastening or any other means found appropriate for the particular intended use.

Embodiments of the present invention have been described with particular reference to the examples illustrated. However, it will be appreciated that variations and modifications may be made to the examples described within the scope of the present invention.

The invention claimed is:

1. A method of manufacturing a composite product from plural components, the method comprising:
    moving the components with a conveyor assembly comprising back-to-back conveyor belts which are driven such that the components are received between the conveyor belts at an input end of the conveyor assembly and moved forward between the conveyor belts;
    applying pressure to the components between the conveyor belts to consolidate the components into a flat form;
    after consolidating the components, passing the conveyor belts through a die, the die having a surface portion with a non-flat sectional profile with respect to the direction in which the conveyor belts are driven, wherein the conveyor belts conform to the non-flat sectional profile as they are driven laterally across the surface portion, such that the flat consolidated components between the conveyor belts are shaped by the surface portion into a non-flat profile as they move through the die; and,
    applying heat to the consolidated components to set the consolidated components into the non-flat profile to form the composite product.

2. The method according to claim 1, further comprising cooling the composite product with a second portion of the die after the composite product has been set in the non-flat profile.

3. The method according to claim 2, wherein the composite product is resiliently biased in the non-flat form, and the second portion of the die transitions from a non-flat profile to a flat profile such that the composite is guided into a flat form against the resilient bias of its non-flat form.

4. The method according to claim 1, further comprising applying heat during the application of pressure to consolidate the components.

5. The method according to claim 1, wherein a belt press is used to consolidate the components, wherein the conveyor belts of the conveyor assembly pass between belts of the belt press and are at least partially driven by the belt press.

6. The method according to claim 1, wherein the composite product has a generally convex surface and a generally concave surface in the non-flat profile, the method comprising, prior to the composite product being passed through the die, applying a first substrate to the surface of the consolidated components that will become the convex surface of the composite product after having been passed through the die and applying a second substrate to the surface of the consolidated components that will become the concave surface of the composite product after having been passed through the die, wherein the first substrate is more extendible than the second substrate, wherein each substrate is either provided by a conveyor belt of the back-to-back conveyor belts or by a membrane positioned between the composite product and a conveyor belt of the back-to-back conveyor belts.

7. The method according to claim 6, further comprising adhering one or both of the surfaces of the consolidated components that will become the convex and concave surfaces of the composite product after having been passed through the die to its respective substrate prior to being passed through the die.

8. The method according to claim 1, further comprising arranging the components such that the composite product forms a bistable rollable coil member.

9. The method according to claim 1, further comprising forming the composite product in the form of a slit tube member and sealing the slit tube to form a pipe.

10. The method according to claim 1, wherein the components include prepreg layers.

11. The method according to claim 1, wherein the composite product is a fibre reinforced composite product comprising a composite binder and composite fibres, wherein the composite binder includes one or more of:
    thermosetting or thermoplastic products; and/or the composite fibres include one or more of:
    E-glass, aramids, carbon, metal fibres, polyester and textile fibres.

12. The method according to claim 1, wherein the components include optic fibres, the method comprising tensioning the optic fibres prior to being fed into the conveyor assembly.

13. The method according to claim 3, comprising coiling the composite product after being guided into the flat form by the die.

* * * * *